United States Patent
Drimbarean et al.

(10) Patent No.: US 7,469,071 B2
(45) Date of Patent: Dec. 23, 2008

(54) IMAGE BLURRING

(75) Inventors: Alexandru Drimbarean, Galway (IE); Peter Corcoran, Claregalway (IE); Eran Steinberg, San Francisco, CA (US)

(73) Assignee: FotoNation Vision Limited, Galway (IE)

( * ) Notice: Subject to any disclaimer, the term of this patent is extended or adjusted under 35 U.S.C. 154(b) by 181 days.

(21) Appl. No.: 11/673,560

(22) Filed: Feb. 10, 2007

(65) Prior Publication Data

US 2007/0189748 A1    Aug. 16, 2007

Related U.S. Application Data

(60) Provisional application No. 60/773,714, filed on Feb. 14, 2006.

(51) Int. Cl.
*G06K 9/40* (2006.01)

(52) U.S. Cl. .................... 382/254; 382/274

(58) Field of Classification Search ................ 382/254, 382/255, 274, 275, 260, 264, 284, 298; 348/25, 348/27, 28, 218.1, 239, 345, 370, 371, 687
See application file for complete search history.

(56) References Cited

U.S. PATENT DOCUMENTS

| | | | |
|---|---|---|---|
| 4,683,496 A | 7/1987 | Tom | |
| 5,063,448 A | 11/1991 | Jaffray et al. | |
| 5,500,685 A | 3/1996 | Kokaram | |
| 5,594,816 A | 1/1997 | Kaplan et al. | |
| 5,621,868 A | 4/1997 | Mizutani et al. | |
| 5,844,627 A | 12/1998 | May et al. | |
| 5,878,152 A | 3/1999 | Sussman | |
| 5,949,914 A | 9/1999 | Yuen | |
| 6,069,982 A | 5/2000 | Reuman | |
| 6,122,408 A | 9/2000 | Fang et al. | |
| 6,240,217 B1 * | 5/2001 | Ercan et al. ................ 382/274 |
| 6,243,070 B1 | 6/2001 | Hill et al. | |
| 6,535,632 B1 | 3/2003 | Park et al. | |
| 6,577,762 B1 | 6/2003 | Seeger et al. | |
| 6,631,206 B1 | 10/2003 | Cheng et al. | |
| 6,744,471 B1 | 6/2004 | Kakinuma et al. | |
| 6,803,954 B1 | 10/2004 | Hong et al. | |

(Continued)

FOREIGN PATENT DOCUMENTS

JP        2002-112095        12/2002

(Continued)

OTHER PUBLICATIONS

Adelson, E. H., "Layered Representations for Image Coding," Massachusetts Institute of Technology: Cambridge, MA 02139, 1991 (20 pages). http://web.mit.edu/persci/people/adelson/pub_pdfs/layers91.pdf.

(Continued)

*Primary Examiner*—Phuoc Tran
(74) *Attorney, Agent, or Firm*—Andrew V. Smith (57) ABSTRACT

A method of blurring an image includes acquiring two images of nominally a same scene taken at a different light exposure levels. At least one region of one of the images includes pixels having saturated intensity values. For at least one of the saturated pixels, values are extrapolated from the other image. At least a portion of a third image is blurred and re-scaled including pixels having the extrapolated values.

14 Claims, 4 Drawing Sheets

U.S. PATENT DOCUMENTS

| | | | |
|---|---|---|---|
| 6,804,408 | B1 | 10/2004 | Gallagher et al. |
| 6,842,196 | B1 | 1/2005 | Swift et al. |
| 6,990,252 | B2 | 1/2006 | Shekter |
| 7,013,025 | B2 | 3/2006 | Hiramatsu |
| 7,317,843 | B2 * | 1/2008 | Sun et al. .................. 382/274 |
| 2002/0093670 | A1 | 7/2002 | Luo et al. |
| 2003/0169944 | A1 | 9/2003 | Dowski et al. |
| 2004/0201753 | A1 | 10/2004 | Kondo et al. |
| 2004/0208385 | A1 | 10/2004 | Jiang |
| 2005/0213849 | A1 | 9/2005 | Kreang-Arekul et al. |
| 2006/0008171 | A1 | 1/2006 | Petschnigg et al. |
| 2006/0104508 | A1 | 5/2006 | Daly et al. |
| 2006/0153471 | A1 | 7/2006 | Lim et al. |

FOREIGN PATENT DOCUMENTS

| | | |
|---|---|---|
| JP | 2006-140594 | 1/2006 |
| WO | WO 02/089046 A1 | 11/2002 |
| WO | WO 2004/017493 A1 | 2/2004 |
| WO | WO 2004/036378 A2 | 4/2004 |
| WO | WO 2004/059574 A2 | 7/2004 |
| WO | WO 2007/095477 A2 | 8/2007 |

OTHER PUBLICATIONS

Aizawa K; Kodama K; Kubota A; Ngan King N; Strintzis Michael G; Tanimoto Masayuki; Wang Yao, "Producing object-based special effects by fusing multiple differently focused images," IEEE transactions on circuits and systems for video technology, 2000, vol. 10, No. 2, pp. 323-330. http://rlinks2.dialog.com/NASApp/ChannelWEB/DialogProServlet?ChName=engineering.

Beir, Thaddeus, "Feature-Based Image Metamorphosis," In Siggraph '92, Silicon Graphics Computer Systems, 2011 Shoreline Blvd, Mountain View CA 94043, http://www.hammerhead.com/thad/thad.html.

Heckbert, Paul S., "Survey Of Texture Mapping (1986)," Proceedings of Graphics Interface '86. IEEE Computer Graphics and Applications, Nov. 1986, pp. 56-67, Graphics Interface '86, May 1986, pp. 207-212. http://citeseer.ist.psu.edu/135643.html.

Hashi Yuzuru, Ikeda Kazuo, Narita Nagato; Iguchi Kazuhisa, "A New Method to Make Special Video Effects. Trace and Emphasis of Main Portion of Images," Japan Broadcasting Corp., Sci. and Techical Res. Lab., JPN, Eizo Joho Media Gakkai Gijutsu Hokoku, 2003, vol. 27, No. 7(BFO2003 20-27/ROFT2003 20-27), p. 23-26 http://rlinks2.dialog.com/NASApp/ChannelWEB/DialogProServlet?ChName=engineering.

Khan, E. A., "Image-based material editing," International Conference on Computer Graphics and Interactive Techniques, pp. 654 663, 2006, ISSN:0730-0301, ACM Press New York, NY, USA. http://portal.acm.org/citation.cfm?id=1141937&coll=GUIDE&dl=GUIDE&CFID=6809268&CFTOKEN=82843223.

Li, Han and Wang, Yenping, "A new model of motion blurred images and estimation of its parameter," in: Acoustics, Speech, and Signal Processing, IEEE International Conference on ICASSP '86, Apr. 1986, vol. 11, pp. 2447-2450, posted online: Jan. 29, 2003 10:26:57.0 http://ieeexplore.ieee.org/search/freesrchabstract.jsp?anumber=1169270&isnumber=26344&punumber=8362&k2dockey=1169270@ieeecnfs&query=%28special+and+effects+and+blur%29+%2Cin%3E+metadata&pos=6.

Potmesil, Michael, et al., "A lens and aperture camera model for synthetic image generation," International Conference on Computer Graphics and Interactive Techniques, Proceedings of the 8th annual conference on Computer graphics and interactive techniques, Dallas, Texas, United States, pp. 297 305, 1981, ISBN:0-89791-045-1, Publisher: ACM Press, New York, NY, USA. http://portal.acm.org/citation.cfm?id=806818&coli=GUIDE&dl=GUIDE&CFID=6809268&CFTOKEN=82843222.

Shenchang Eric Chen, et al., "View interpolation for image synthesis," International Conference on Computer Graphics and Interactive Techniques, Proceedings of the 20th annual conference on Computer graphics and interactive techniques, pp. 279 288, 1993, ISBN:0-89791-601-8, Publisher: ACM Press, New York, NY, USA. http://portal.acm.org/citation.cfm?id=166153&coli=GUIDE&dl=GUIDE&CFID=6809268&CFTOKEN=82843223.

Notification of Transmittal of the International Search Report and the Written Opinion of the International Searching Authority, or the Declaration for PCT application No. PCT/US2007/061956, dated Mar. 14, 2008, 9 pages.

* cited by examiner

IMAGE BLURRING

PRIORITY

This application claims the benefit of priority to U.S. provisional patent application No. 60/773,714, filed Feb. 14, 2006. This application is related to U.S. patent application Ser. No. 11/319,766, filed Dec. 27, 2005 and Ser. No. 11/217, 788, filed Aug. 30, 2005, and Ser. No. 11/421,027, filed May 30, 2006. All of these applications are incorporated by reference.

BACKGROUND

1. Field of the Invention

The present invention relates to image blurring, and in particular, to a system and method for creating blur in an image to reduce the depth of field of the image.

2. Description of the Related Art

In digital cameras, the depth of field (hereinafter "DOF") is typically much greater than for cameras which use film due to the image sensor being somewhat smaller than in a 35 mm film negative. This means that portrait images captured with digital cameras, in particular, will tend to have the background in sharp focus, which is often not desirable as a photographer may wish to emphasize a person's face and de-emphasize the background of the picture. This problem may be corrected by careful photography combined with careful use of camera settings.

Figure 1:
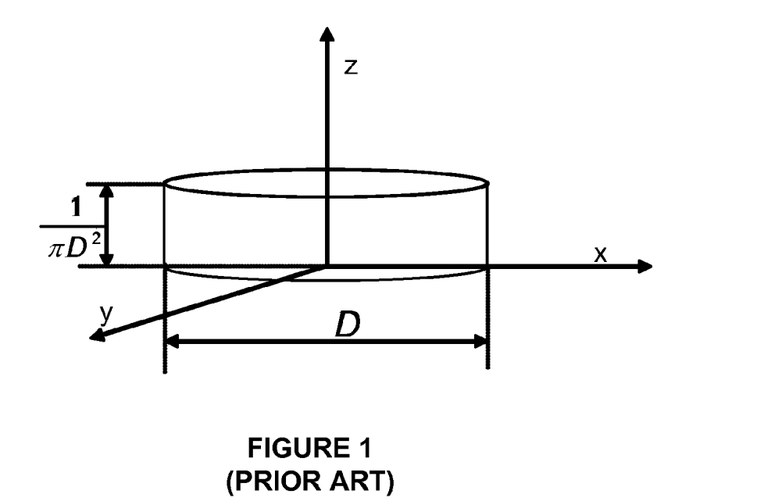
FIG. 1 depicts a conventional circular convolution kernel.
Figure 2A:
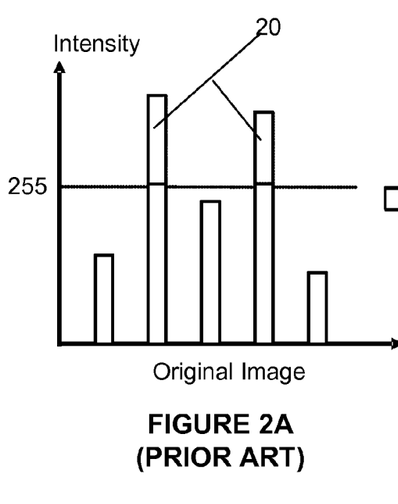
FIGS. 2a-2b depict conventional image blurring using a circular convolution kernel.
Figure 2B:
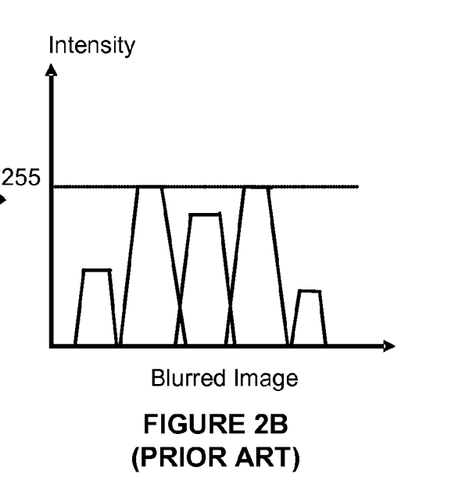

Alternatively, portrait images may be blurred semi-manually by professional photographers using desktop computer image processing software after an image has been captured. This involves manual intervention and is often time-consuming. Nonetheless, such conventional blurring software may apply various techniques using convolution kernels to create blurring effects, as illustrated in FIGS. 1 and 2.

Generically, convolution can be expressed according to the equation below:

$$B = I * g$$

where B is the blurred image, I is the original image and g is the convolution kernel. Convolution blur may be applied on a pixel-by-pixel basis. So, for a particular pixel with coordinates (x,y), the convolution with a kernel of size (M×N) can be written as:

$$B(x, y) = \sum_{j}^{N} \sum_{i}^{M} I(x-i, y-j) g(i, j)$$

The size and shape of the kernel influence the blurring result. The size determines the strength of the blur and therefore the perceived depth of the object. The shape determines the visual aspect of the blur and is related to what is called "circle of confusion".

A circular kernel of a diameter D has the following analytical form $$g(i, j) = \begin{cases} \frac{1}{\pi D^2} & \text{if } \sqrt{i^2 + j^2} \leq D \\ 0 & \text{otherwise} \end{cases}$$

and a geometrical shape of a cylinder or "pillbox", as is illustrated in FIG. 1. Referring now to FIGS. 2a-2b, the effects of a convolution kernel on a row of pixels within a flash image of a scene are illustrated. The most intense (bright areas) of the original image, i.e., in this example pixels 2 and 4 taken from left to right, undergo saturation clipping to the maximum of the dynamic intensity range (e.g., 255 for 8 bit/pixel image) as depicted by dashed outlines 20, while pixels 1, 3 and 5 are not clipped. Due to convolution, a resulting blurred image lacks the contrast and sharpness present in the scene, therefore creating a less appealing visual effect. Such blurring techniques simply do not achieve realistic results and do not resemble an image with a shallow DOF as desired.

SUMMARY OF THE INVENTION

A method is provided for creating blur in an image acquired with a digital camera for printing or electronic display or both. A first image of a scene is acquired at a first exposure level, and a second image of nominally the same scene is acquired at a second exposure level. At least one region of the second image includes one or more pixels having saturated intensity values. For at least one of said saturated pixels, one or more values are extrapolated from the first image. A third image is generated including pixels of the second image having non-saturated values, and pixels having the one or more extrapolated values. At least a portion of the third image is blurred and re-scaled.

The first image may be acquired without a flash and the second image may be acquired with a flash exposure level.

A value may be extrapolated for a saturated pixel by calculating at least one ratio of an intensity of a pixel in said first image to an intensity of at least one non-saturated pixel, and providing the extrapolated value for a selected pixel in accordance with the intensity ratio. A non-saturated pixel may include a pixel in the first image which corresponds to a pixel in the second image which has not undergone saturation clipping.

One or more portions of said third image may be determined to correspond to foreground of the image, and portions may be determined which correspond to background of the image. The background portions may be blurred.

Regions of said first and second images may be aligned at least in respect of the at least one portion. The first image may be a relatively low resolution image and the second image may be a higher resolution image, and the resolutions of the first and second images may be matched. The resolution the resolution of the second image may be downsampled to the resolution of said first image, or the resolution of the first image may be upsampled to the resolution of the second image, or a combination thereof.

The blurring of the third image may be performed by applying a convolution kernel to the at least one portion. The kernel may be a circular kernel.

The third image may include a copy of the second image modified by replacing the saturated intensity values with the extrapolated values.

The third image may include the second image modified by replacing the saturated intensity values with the extrapolated values.

The re-scaling may include scaling the blurred portion of the third image to a range associated with the second image.

A further method is provided for generating a digital image. At least two images are acquired, including a full resolution image having one or more pixels with a saturated intensity value. One or more intensity ratios are determined from unsaturated pixels of another of the at least two acquired images. The full resolution image is modified including restoring the one or more intensity ratios determined from the unsaturated pixels of the other acquired image. A portion of the modified image is blurred, and the modified image is stored, displayed or printed, or combinations thereof.

The modifying may include adding intensity to the one or more saturated pixels, or subtracting intensity from one or more unsaturated pixels, or a combination thereof.

The blurring may include determining one or more portions of the modified image which correspond to foreground of the image and portions which correspond to background of the image, and blurring the background portions. The blurred portion of the modified image may be rescaled.

One or more processor readable storage devices are also provided with processor readable code embodied thereon for programming one or more processors to perform a method of creating blur in a digital image as disclosed herein.

A digital image processing device is also provided which is operable to blur an acquired image, and includes a controller and the one or more processor readable storage devices.

BRIEF DESCRIPTION OF THE DRAWINGS

Preferred and alternative embodiments will now be described, by way of example, with reference to the accompanying drawings, in which.

DETAILED DESCRIPTION OF THE EMBODIMENTS

Techniques and components for obtaining a more realistic blur in a digitally-acquired image similar to the low DOF blur generated by a conventional film camera are provided.

The low contrast and sharpness associated with conventional blurring techniques are mitigated or reduced or eliminated in accordance with embodiments described herein. Furthermore, lens effects of circle of confusion are emulated, as described in more detail below.

As illustrated in FIGS. 2a-2b, saturation clipping leads to a loss of high dynamic range, HDR, information about the image. In one embodiment of the present invention, this information is advantageously recovered to provide a more realistic blurring of an image of a scene.

Figure 3:
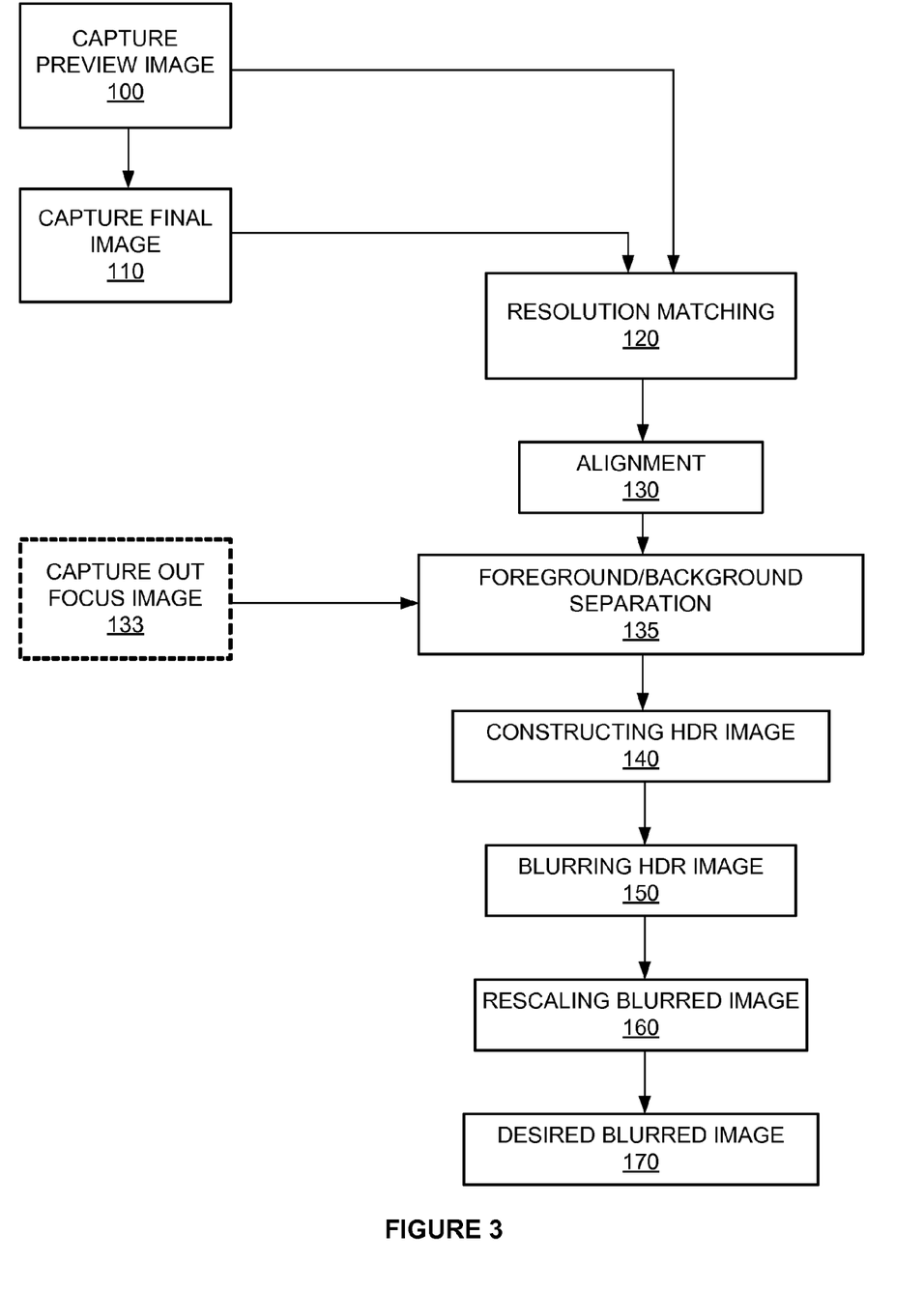
FIG. 3 illustrates a flow diagram in accordance with one embodiment.

Referring now to FIG. 3, final a low-resolution non-flash image of a scene (herein after referred to as a preview image) is captured at 100 prior to capturing a full-resolution flash image of a scene at 110. However, it will be appreciated that alternatively the preview may comprise any one or more of a series of captured non-flash low-resolution images. Alternatively, the non-flash image of the scene can be captured after the full-resolution flash version and as such may be a post-view image. The preview image may also be another full-resolution image or a down-sampled version thereof. For ease of reference, the term "preview image" is intended to include each of these. This embodiment may also be seen that the present invention can be applied even where the final full-resolution image 110 is captured without a flash. In such cases, the final full-resolution image 110 is may be taken at an exposure level which is the same as or different (usually higher) than, and is preferably higher than, that of the preview image 100 and so includes may include more pixels with saturated values than the preview image.

The preview image may be utilized for various tasks such as auto-focus, white balance or to estimate exposure parameters. Preferably, the preview image is stored in a memory of the camera for use with other processing techniques. Alternatively the preview image may be stored in any suitable memory device, or may be only temporarily used or stored in the camera.

Figure 4A:
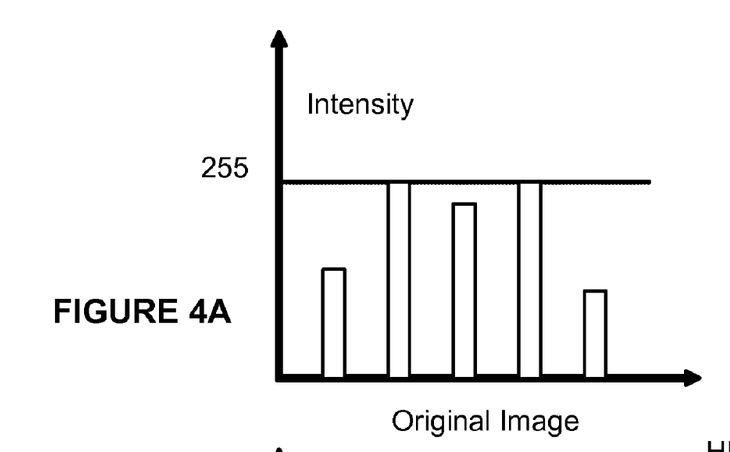
FIGS. 4a-4c depict graphical representations of corresponding portions of a low-resolution or full resolution non-flash image and/or a preview image, a full resolution flash image or an image captured under another high light intensity exposure condition, and a high dynamic range (HDR) image derived therefrom according to another embodiment.
Figure 4B:
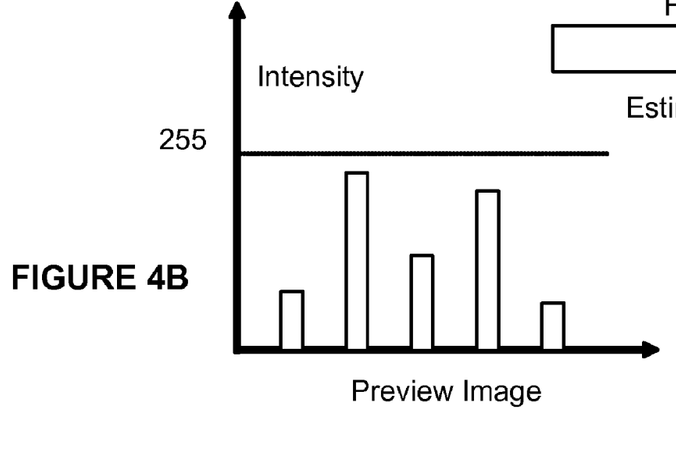
Figure 4C:
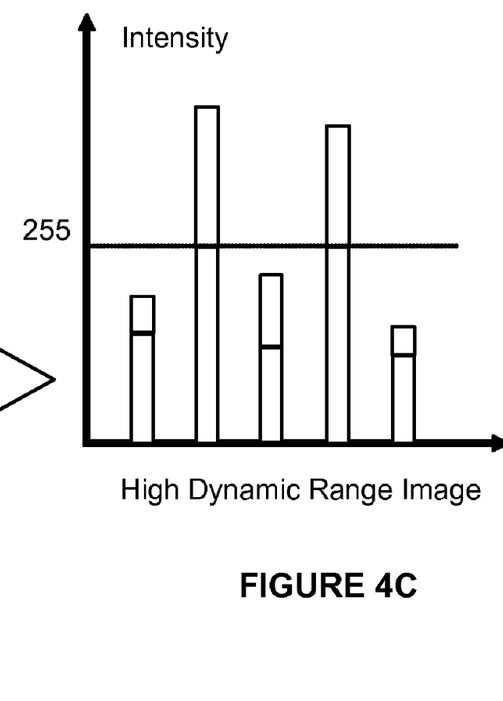

The remainder of the blocks in the flow process illustrated at FIG. 3 are described below with reference to FIGS. 4a-4c and 5a-5b, which further illustrate some of those process blocks. Referring to FIGS. 4a-4c, for purposes of illustration, intensity values of five pixels, which are preferably only a portion of one full row of multiple rows of pixels of a full resolution image or original image (FIG. 4a), a preview image (FIG. 4b) and a high dynamic range image (FIG. 4c), or HDR image, are graphically represented.

Intensity levels of the portion of the row of pixels of the full resolution image, that may have been taken with a flash or under another high light exposure condition, are graphically represented at FIG. 4a. As earlier illustrated with reference to FIG. 2a, this full resolution image has been subjected to saturation clipping due to the dynamic intensity range limit. In this case, pixels 2 and 4, taken from left to right, have been clipped from values higher than 255 each to the limit of 255, while pixels 1, 3 and 5 have not been clipped. Therefore valuable information about the scene is eliminated from the full resolution, high exposure image. For one, the ratio of intensities of pixels 2 and 4 to pixels 1, 3 and 5 has been altered. The ratio between pixels 2 and 4 may also have been altered in the clipping process, and in fact was in the example illustrated at FIG. 2a.

As a preview image in the example illustrated at FIG. 4b is preferably a non-flash image, saturation clipping generally does not occur and as such no exposure information or relatively little exposure information about the scene is lost. In FIG. 4b, all five representative pixels has an intensity level below 255, so that none are clipped and the actual intensity ratios between each of the five pixels remains intact.

In continuing with the description of the process of FIG. 3, the preview and full resolution images are brought to the same resolution at 120, i.e., their resolutions are matched. In the preferred embodiment, the resolution of the images is matched by downsampling the flash image to the resolution of the preview image. Alternatively, the resolutions of the images may be matched by any combination of upsampling the preview image or downsampling the resolution of the flash image. However it will be appreciated any suitable means of bringing the images to the same resolution may be employed. Of course, if the resolutions are the same to begin with then 120 may be skipped.

The preview and full resolution images are then aligned at 130, using image registration techniques, to compensate for any slight movement in the scene or camera between taking these images. Alignment may be performed globally across entire images or locally using various techniques, e.g., as may be described in co-pending U.S. patent application Ser. No.

11/217,788 filed Aug. 30, 2005, which is assigned to the same assignee, incorporated by reference, and not otherwise further expressly described herein. Again, if the images are already fully aligned, then the alignment at 130 would involve no modifications.

Utilizing intensity information derived from the preview image, a high dynamic range (HDR) image is constructed at 140 from the full resolution image. The HDR image incorporates an estimate of the information (bright areas) eliminated from the flash image by saturation clipping. The dashed rectangles above each of the intensity level bar representations from each of the five pixels in FIG. 4c illustrates these estimates. FIG. 2a showed dashed rectangle only over pixels 2 and 4 which were the only pixels clipped. FIG. 4c has not only pixels 2 and 4 reduced to the limit of 255, but has pixels 1, 3 and 5 reduced as well. One or both of pixels 2 and 4 could alternatively be reduced below 255 in the HDR image of FIG. 4c. The ratios of the intensities between the pixels 2 and 4 to pixels 1, 3 and 5 in the HDR image of FIG. 4c is preferably closer to actual object intensity ratios than FIG. 4a.

In one embodiment, the HDR image is achieved by determining an intensity ratio between two or more neighbouring pixels in the preview image, one of which will be clipped in the flash image; and the intensity values of one or more non-saturated pixels in the flash image. It will however be appreciated that the intensity ratio for each saturated pixel may be determined with respect to one or more non-neighbouring comparison pixels. Using this ratio information, the intensity of each of the clipped pixels of the flash image is extrapolated in proportion to the intensity ratio derived from the corresponding preview image pixel(s).

For example, the ratio of the intensity of a first pixel of a preview image to the intensity of a neighbouring pixel of the preview image is determined. In the case where the first pixel's corresponding pixel in the flash image has been saturation clipped, the intensity of the clipped pixel is increased in accordance with the ratio information in order to restore the pixel to its original intensity ratio with respect to its neighbouring or comparison pixels. This process may be carried out for all saturated pixels to produce a HDR image. All of the pixels may be increased in intensity or decreased in intensity or a combination of increase and decrease, depending on other processes that may be in use such as selected fill-flash (see U.S. application Ser. No. 10/608,810, incorporated by reference). The ratios may be adjusted precisely to preview image ratios, or otherwise as illustrated in FIG. 4c, for example. In this way, the HDR image is made to resemble a flash image and/or high exposure image which was not subjected to saturation clipping. A portion of a row of pixels of the HDR image corresponding to pixels of the original and preview images is depicted graphically in FIG. 4c with the intensity ratios of the preview image being substantially the same as those provided in HDR image when the solid line and dashed line rectangles are each included.

While this illustrative embodiment has been described in terms of providing a separate HDR image from the images 100, 110, another embodiment would provide for adjusting the values of the flash image 110 and using this adjusted image according to the below. In one embodiment, as disclosed in U.S. application Ser. No. 11/217,788 filed Aug. 30, 2005, the HDR image may undergo a digital segmentation process 135 to determine foreground and/or background within at least one portion of the image. In one exemplary implementation, the HDR image is compared to a preview non-flash image 100 of nominally the same scene. Overall light distribution may vary between the two images, because one image or subset of images will be illuminated only with available ambient light while another is illuminated with direct flash light, thereby enabling the HDR image to be separated into foreground and background. As an alternative to using the HDR image, the full resolution and/or flash image 110 can be compared with a preview image 100 to perform foreground/background segmentation which could in turn be applied for use in processing the HDR image; or alternatively a flash and a non-flash preview image or one each full-resolution images could be used for foreground/background segmentation again for use in processing a HDR image, as could two flash or two non-flash images when captured at different exposure levels such that advantages illustrated at FIGS. 3-5 and in corresponding text description herein may be achieved.

Alternatively, foreground and background regions of a HDR image may be separated at 135 (FIG. 3) by a method disclosed in U.S. provisional application Ser. No. 60/773,714 (Incorporated by reference). In this embodiment, one flash or non-flash image of a scene may be taken with the foreground more in focus than the background and which can be converted to a HDR image, e.g., according to the above. The HDR image may then be stored in, e.g., DCT-coded format or similar. A second out of focus image of nominally the same scene may be taken at 133 (FIG. 3), and also stored in DCT-coded format. The two DCT-coded images may then be compared and regions of the HDR image assigned as foreground or background according to whether the sum of selected high order DCT coefficients are decreased or increased relative to equivalent regions of the second image.

Figure 5A:
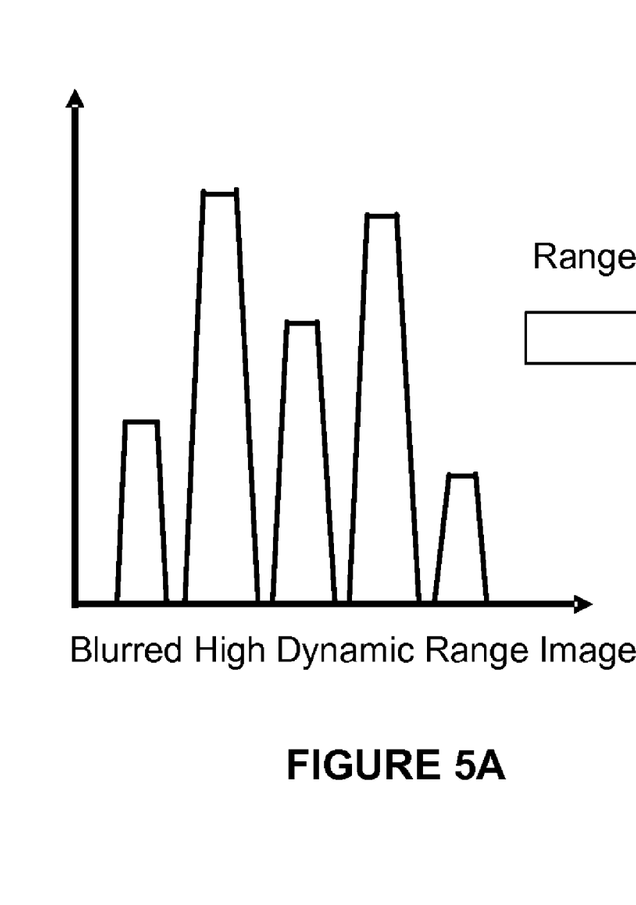
FIGS. 5a-5b depicts a graphical representation of a portion of a blurred image of the HDR image of FIG. 4c, and a re-scaled blurred image derived therefrom according to another embodiment.
Figure 5B:
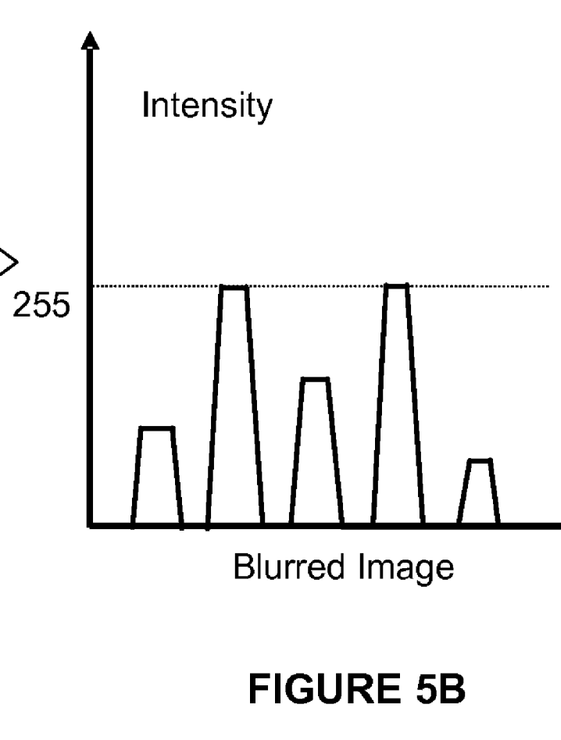

In one embodiment, as depicted in FIGS. 5a-5b, regions of the HDR image labeled as background from the above description may be blurred at 150 of FIG. 3 with a circular kernel that resembles the PSF (point spread function) of a lens of a camera to emulate a real effect of optical blur. FIG. 5a illustrates intensity levels of five exemplary pixels of the HDR image which are blurred. A circular shaped kernel may be advantageously employed because it approximates a real lens aperture effect. Also, since the lens does not amplify or reduce the amount of light passing through, the convolution kernel is derived such as the sum of all its values equals 1, i.e.:

$$\sum_{i,j}^{M,N} g(i, j) = 1$$

Other suitably shaped kernels may be utilized. The range of the blurred image produced in step 150 of FIG. 3 is then scaled back, as illustrated at FIG. 5b and at block 160 of FIG. 3, to the range of the full resolution image to produce a realistically blurred image at block 170 similar to the low depth-of-field blur generated by a film-based camera.

It will be seen that many variations of the above embodiments are possible. For example, image processing software described in FIG. 3 can be implemented completely in a camera or as part of an external processing device such as a desktop computer which is provided with the images 100, 110, 133.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to the claims below and/or preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

In addition, that which is described as background, the invention summary, the abstract, the brief description of the drawings and the drawings themselves, as well as all references cited above herein, and US published applications nos. 2005/0068448, 2006/0098237, 2006/0204110, 2006/0098890, 2006/0288071, and 2006/0285754, and U.S. provisional applications Nos. 60/746,363 and 60/803,980, which are assigned to the same assignee, are hereby incorporated by reference into the detailed description of the preferred embodiments as providing alternative embodiments.

The invention claimed is:

1. A digital image processing device operable to blur an acquired image, comprising a controller and one or more processor readable storage devices having processor readable code embodied thereon, said processor readable code for programming one or more processors to perform a method of creating blur in a digital image, the method comprising:
   (a) acquiring a first image of a scene taken at a first exposure level;
   (b) acquiring a second image of nominally the same scene taken at a second exposure level greater than said first exposure level, wherein at least one region of said second image includes one or more pixels having saturated intensity values, and wherein one or more corresponding pixels of the first image do not have saturated intensity values;
   (c) for at least one of said saturated pixels, extrapolating one or more values from said first image;
   (d) generating a third image comprising pixels of said second image having non-saturated values, and pixels having said one or more extrapolated values;
   (e) blurring at least a portion of the third image; and
   (f) re-scaling the blurred portion of the third image.

2. The digital image processing device of claim 1, wherein the first image is acquired without a flash and wherein the second image is acquired with a flash exposure level.

3. The digital image processing device of claim 1, wherein extrapolating a value for a saturated pixel comprises:
   calculating at least one ratio of an intensity of a pixel in said first image to an intensity of at least one non-saturated pixel; and
   providing said extrapolated value for a selected pixel in accordance with said intensity ratio.

4. The digital image processing device of claim 3, wherein said non-saturated pixel comprises a pixel in said first image which corresponds to a pixel in said second image which has not undergone saturation clipping.

5. The digital image processing device of claim 1, wherein the method further comprises:
   determining one or more portions of said third image which correspond to foreground of the image and portions which correspond to background of the image; and
   blurring said background portions.

6. The digital image processing device of claim 1, wherein said blurring of said third image comprises applying at least one convolution kernel to said at least one portion.

7. The digital image processing device of claim 6, wherein said kernel comprises a circular kernel.

8. The digital image processing device of claim 1, wherein said third image comprises a copy of said second image modified by replacing the saturated intensity values with the extrapolated values.

9. The digital image processing device of claim 1, wherein said third image comprises said second image modified by replacing the saturated intensity values with the extrapolated values.

10. The digital image processing device of claim 1, wherein said re-scaling comprises scaling said blurred portion of said third image to a range associated with said second image.

11. A method for creating blur in an image acquired with a digital camera for printing, image processing or analysis, or electronic storage, transmission or display, or combinations thereof, said method comprising:
   (a) acquiring a first image of a scene taken at a first exposure level;
   (b) acquiring a second image of nominally the same scene taken at a second exposure level greater than said first exposure level, wherein at least one region of said second image includes one or more pixels having saturated intensity values, and wherein one or more corresponding pixels of the first image do not have saturated intensity values;
   (c) for at least one of said saturated pixels, extrapolating one or more values from said first image;
   (d) generating a third image comprising pixels of said second image having non-saturated values, and pixels having said one or more extrapolated values;
   (e) bluffing at least a portion of the third image; and
   (f) re-scaling the blurred portion of the third image.

12. The method of claim 11, further comprising:
   determining one or more portions of said third image which correspond to foreground of the image and portions which correspond to background of the image; and
   blurring said background portions.

13. The method of claim 11, wherein said blurring of said third image is performed by applying at least one convolution kernel to said at least one portion.

14. The method of claim 11, wherein said third image comprises said second image modified by replacing the saturated intensity values with the extrapolated values.

* * * * *

UNITED STATES PATENT AND TRADEMARK OFFICE
CERTIFICATE OF CORRECTION

| | | |
|---|---|---|
| PATENT NO. | : 7,469,071 B2 | |
| APPLICATION NO. | : 11/673560 | |
| DATED | : December 23, 2008 | |
| INVENTOR(S) | : Alexandru Drimbarean et al. | |

It is certified that error appears in the above-identified patent and that said Letters Patent is hereby corrected as shown below:

At column 8, line 45, replace "bluffing" with --blurring--.

Signed and Sealed this

Thirty-first Day of March, 2009

JOHN DOLL
*Acting Director of the United States Patent and Trademark Office*